(12) United States Patent
Winiger et al.

(10) Patent No.: US 8,528,956 B1
(45) Date of Patent: Sep. 10, 2013

(54) VEHICLE STORAGE COMPARTMENT ASSEMBLY

(75) Inventors: Daniel B. Winiger, East Liberty, OH (US); Simon Hon-Sok Yu, Los Angeles, CA (US); Neal W. Luginbill, Marysville, OH (US); Douglas E. Haunhorst, Powell, OH (US); Robert M. Ray, III, Powell, OH (US); Johnathan D. Norman, San Pedro, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/424,437

(22) Filed: Mar. 20, 2012

(51) Int. Cl.
*B60R 7/04* (2006.01)

(52) U.S. Cl.
USPC ................................ 296/24.34; 296/37.8

(58) Field of Classification Search
USPC .............................................. 296/24.34, 37.8
See application file for complete search history.

(56) References Cited

U.S. PATENT DOCUMENTS

| | | | |
|---|---|---|---|
| 4,453,759 A | 6/1984 | Kathiria | |
| 5,205,452 A * | 4/1993 | Mankey | 224/275 |
| 5,316,368 A | 5/1994 | Arbisi | |
| 6,619,738 B1 | 9/2003 | Filipovich | |
| 6,851,736 B1 | 2/2005 | Klopp, III et al. | |
| 7,455,016 B2 * | 11/2008 | Perin | 108/44 |
| 7,739,963 B2 | 6/2010 | Chou et al. | |
| 8,256,814 B2 * | 9/2012 | Thorsell et al. | 296/24.34 |
| 2001/0020620 A1 * | 9/2001 | Katagiri et al. | 220/345.2 |
| 2007/0063553 A1 | 3/2007 | Lilov et al. | |
| 2009/0278370 A1 | 11/2009 | DePue | |
| 2010/0090491 A1 | 4/2010 | Hipshier et al. | |
| 2010/0201147 A1 | 8/2010 | Jones et al. | |
| 2011/0140472 A1 | 6/2011 | Vander Sluis et al. | |
| 2011/0215606 A1 * | 9/2011 | Trivedi | 296/24.34 |

OTHER PUBLICATIONS

International Search Report and Written Opinion of PCT/US2013/029074 dated Mar. 29, 2013.

* cited by examiner

*Primary Examiner* — Dennis Pedder
*Assistant Examiner* — Beverly Becker
(74) *Attorney, Agent, or Firm* — Rankin Hill & Clark LLP

(57) ABSTRACT

A vehicle storage compartment assembly including a housing defining a storage compartment with an upward facing opening, a first closure pivotally mounted to the housing for movement between a pivot closed position and a pivot open position, and a second closure slidably and pivotally mounted to the housing for movement among a slide closed position, a slide open position and a pivot open position. The first closure covers a first portion of the upward facing opening when in the pivot closed position and the second closure covers a second portion of the upward facing opening when in the slide closed position.

21 Claims, 10 Drawing Sheets

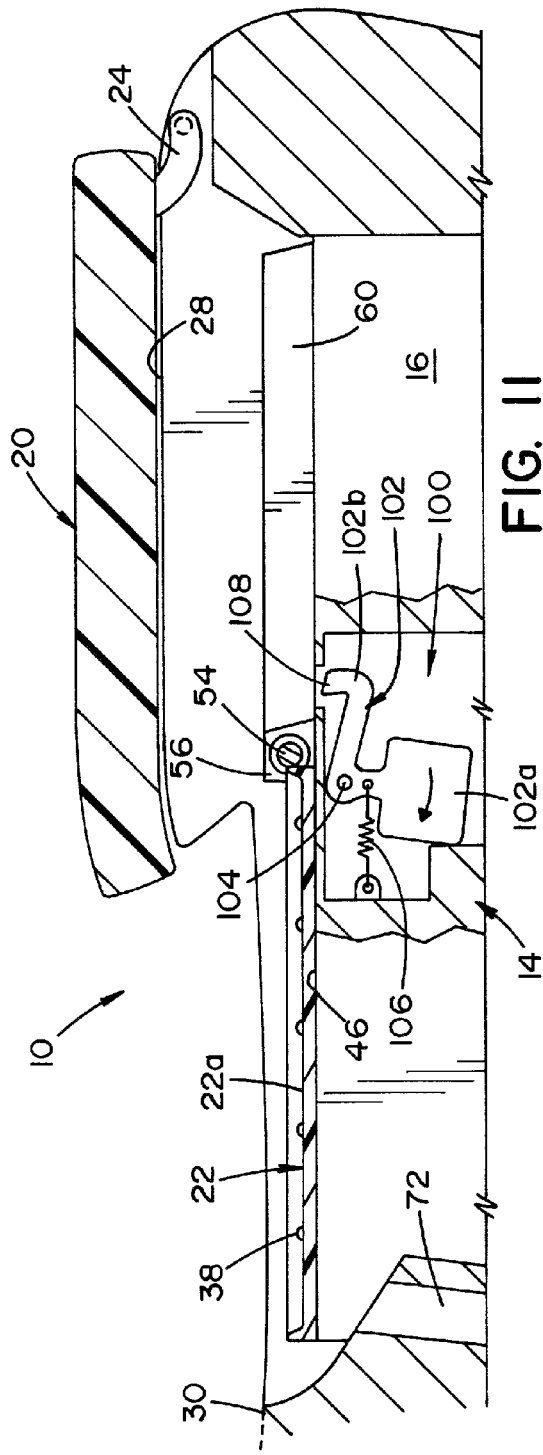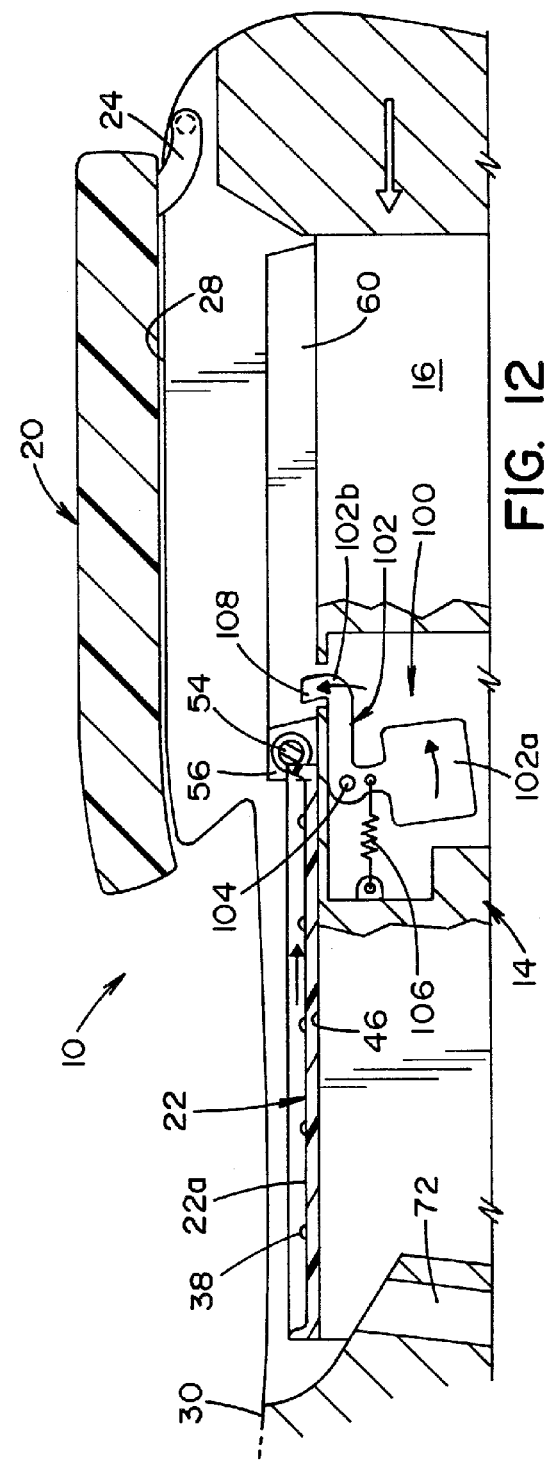

VEHICLE STORAGE COMPARTMENT ASSEMBLY

BACKGROUND

The present disclosure generally relates to a vehicle storage compartment assembly, and particularly relates to a vehicle storage compartment assembly that functions as a center console storage compartment assembly for a vehicle.

A wide variety of storage compartment assemblies for vehicles are known, including those disposed in the console area of the vehicle. Many vehicles include a storage compartment disposed in a center console housing that has a pivotal armrest secured thereto that selectively provides for access to the storage compartment. More particularly, the armrest can be pivoted open to access the storage compartment or can be pivoted closed to close the storage compartment and serve as an armrest. Other vehicles include a sliding tray function in association with the center console storage area. For example, these other vehicles can have a tray that slides relative to a housing of the center console for accommodating various items, such as coins, electronic devices, PDAs (personal digital assistants), etc.

There are sometimes competing interests in designing center console areas. For example, it may be desirable to have the largest possible storage compartment within the center console area, but it may likewise be desirable to limit the size of the armrest disposed over the center console storage area, such as for aesthetic reasons. Reducing the size of the armrest may cause a corresponding reduction in the size of the storage compartment, or at least in the size of the opening that provides access to the storage compartment. Maintaining an acceptable size for the storage compartment or the opening thereto may require the armrest to be undesirable large.

SUMMARY

According to one aspect, a vehicle storage compartment assembly including a housing defining a storage compartment with an upward facing opening, a first closure pivotally mounted to the housing for movement between a pivot closed position and a pivot open position, and a second closure slidably and pivotally mounted to the housing for movement among a slide closed position, a slide open position and a pivot open position. The first closure covers a first portion of the upward facing opening when in the pivot closed position and the second closure covers a second portion of the upward facing opening when in the slide closed position.

According to another aspect, a center console storage compartment assembly for a vehicle includes a housing, a first closure and a second closure. The housing defines a storage compartment therein with an opening to access the storage compartment. The first closure is pivotally secured to the housing for selectively covering a rear portion of the opening. A second closure is movably secured to the housing for selectively closing a forward portion of the opening. The second closure is movable from a slide closed position wherein the second closure closes the forward portion of the opening to a slide open position where an access is provided through the forward portion. The second closure is further movable from the slide open position to a pivot open position together with the first closure moving to a pivot open position wherein access is provided through the rear portion of the opening.

According to a further aspect, a dual closure storage assembly for a vehicle includes a first closure pivotally secured to a housing for selectively closing a rear portion of an upward facing opening of a storage compartment, and a second closure slidably and pivotally connected to the housing for selectively closing a forward portion of the upward facing opening of the storage compartment.

BRIEF DESCRIPTION OF THE DRAWINGS

FIG. 11 is a partial cross-sectional view showing a latch arrangement for the second closure in a first, unlatched position.

FIG. 12 is another partial cross-sectional view similar to FIG. 11 but showing the latch arrangement in a second, latched position.

DETAILED DESCRIPTION

Figure 1:
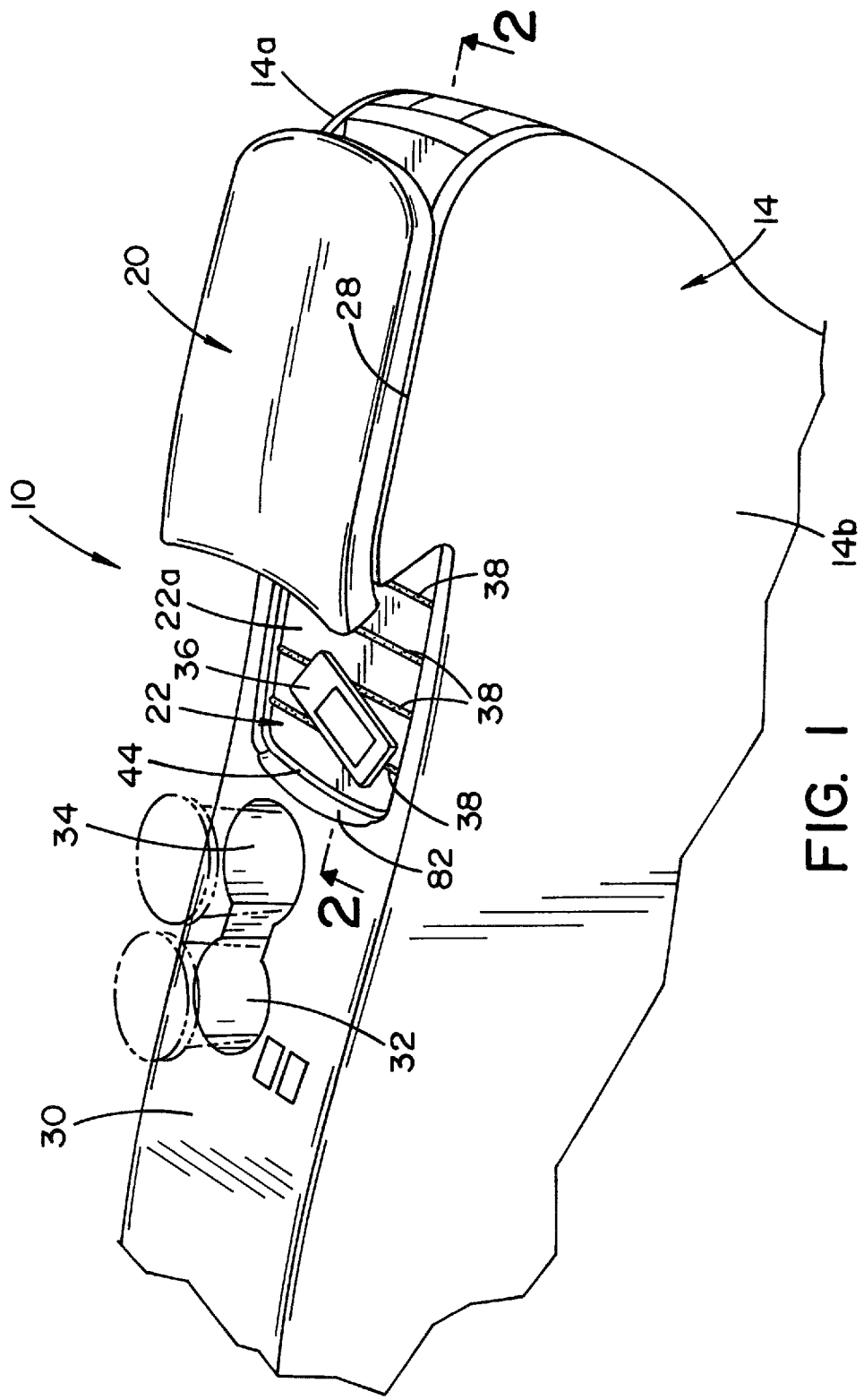
FIG. 1 is a partial perspective view of a center console storage compartment assembly for a vehicle having a housing, a first closure shown in a closed position and a second closure also shown in a closed position.

Referring now to the drawings, wherein the showings are for purposes of illustrating one or more exemplary embodiments and not for purposes of limiting same, FIGS. 1-6 illustrate a vehicle storage compartment assembly 10 configured as a center console storage compartment assembly for a vehicle. As will be described in more detail below, the illustrated storage compartment assembly 10 is a dual closure storage assembly for a vehicle and can be applied in the vehicle as a center console storage compartment assembly disposed between right and left side front seats of the vehicle. The illustrated storage compartment assembly 10 includes a housing 14 defining a storage compartment 16 therein with an upward facing opening 18 provided to access the storage compartment 16. As will be described in more detail below, the storage compartment 16 can be sufficiently sized to fully accommodate larger articles (e.g., purse 80 shown in FIG. 6).

Figure 4:
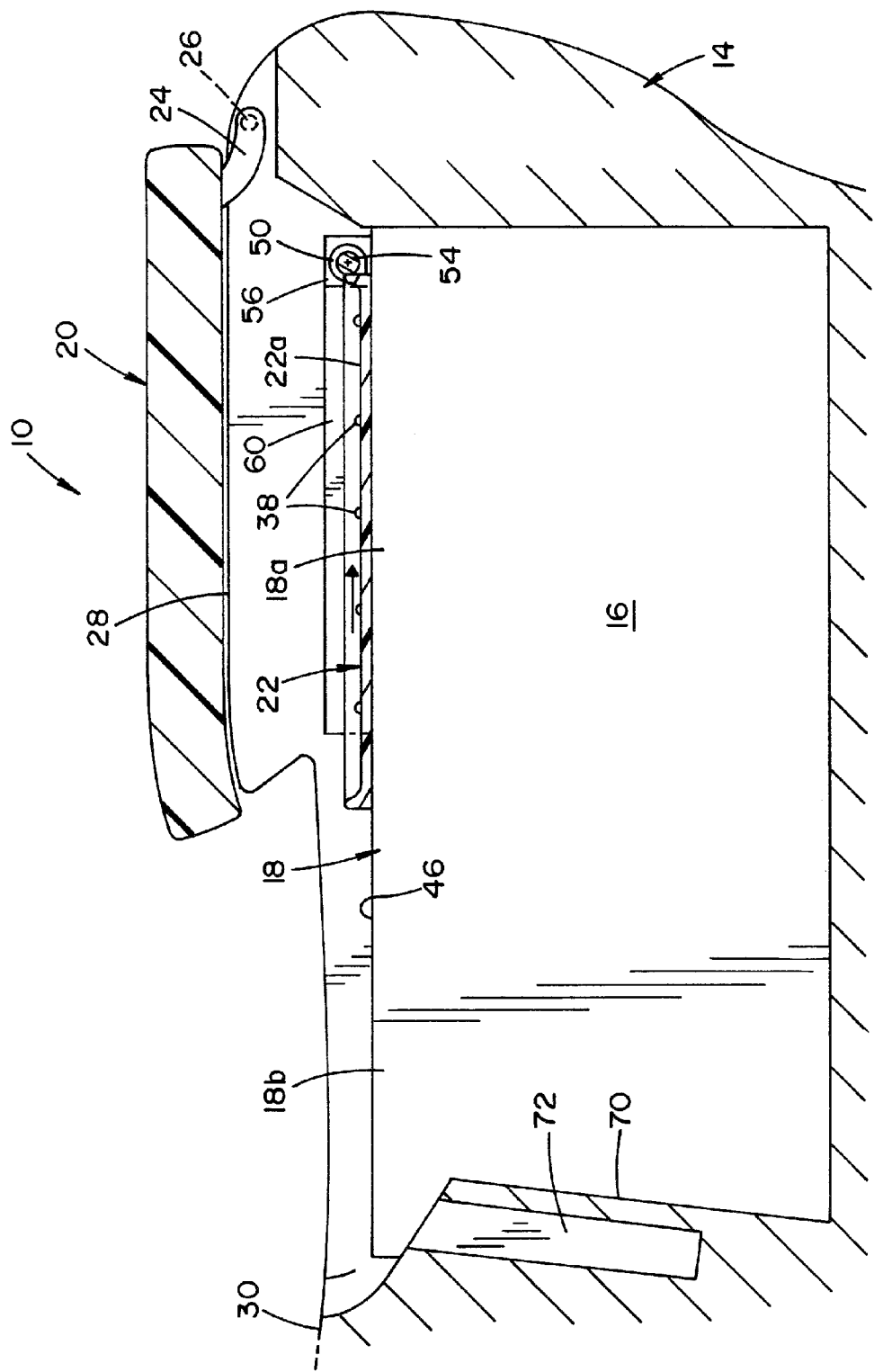
FIG. 4 is a cross-sectional view taken along the line 4-4 of FIG. 3.
Figure 5:
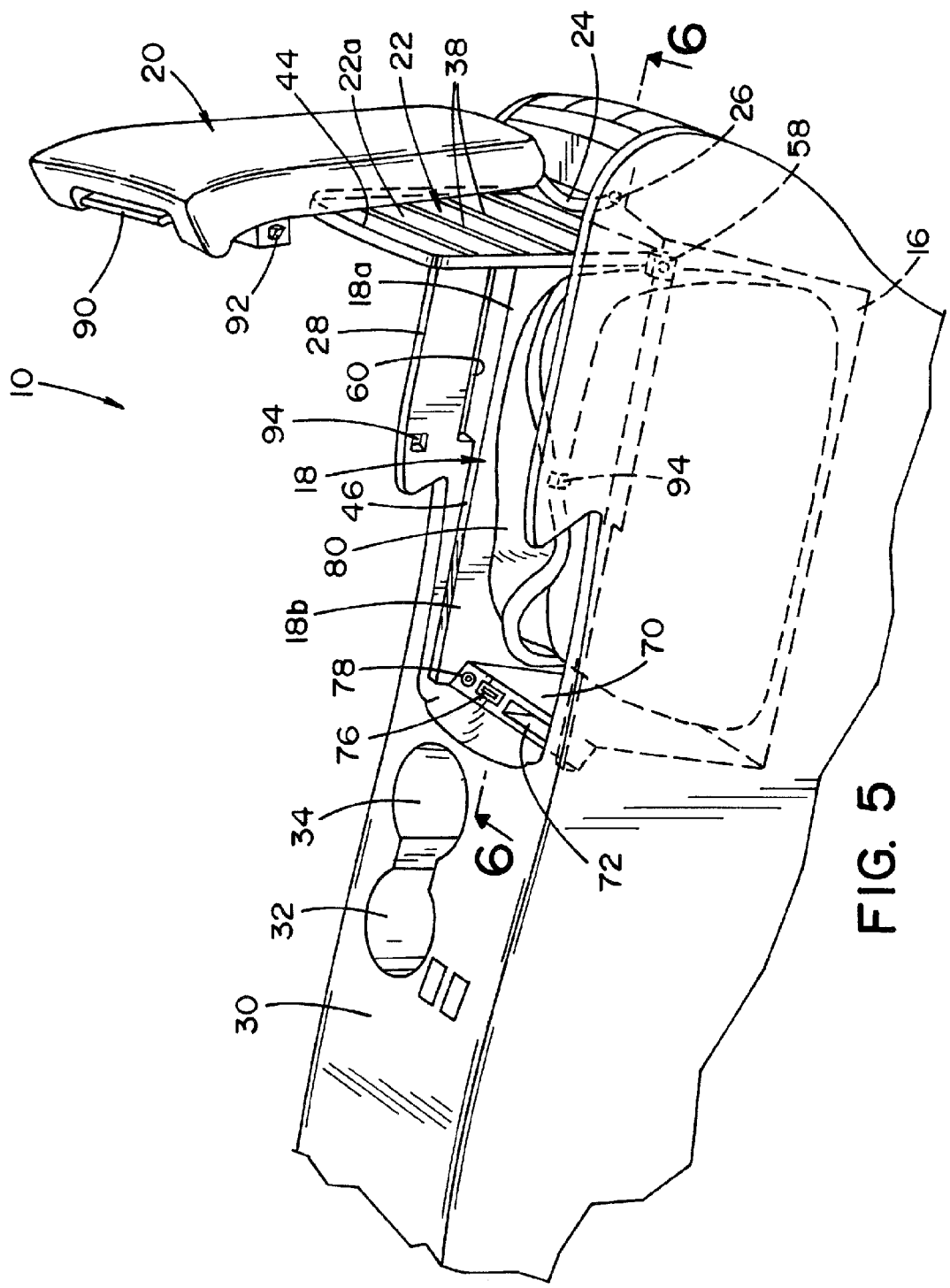
FIG. 5 is still another partial perspective view of the center console storage compartment assembly, similar to FIG. 1, but showing the first and second closures in respective pivot open positions and showing an article (e.g., a purse) received in a storage compartment of the assembly.
Figure 6:
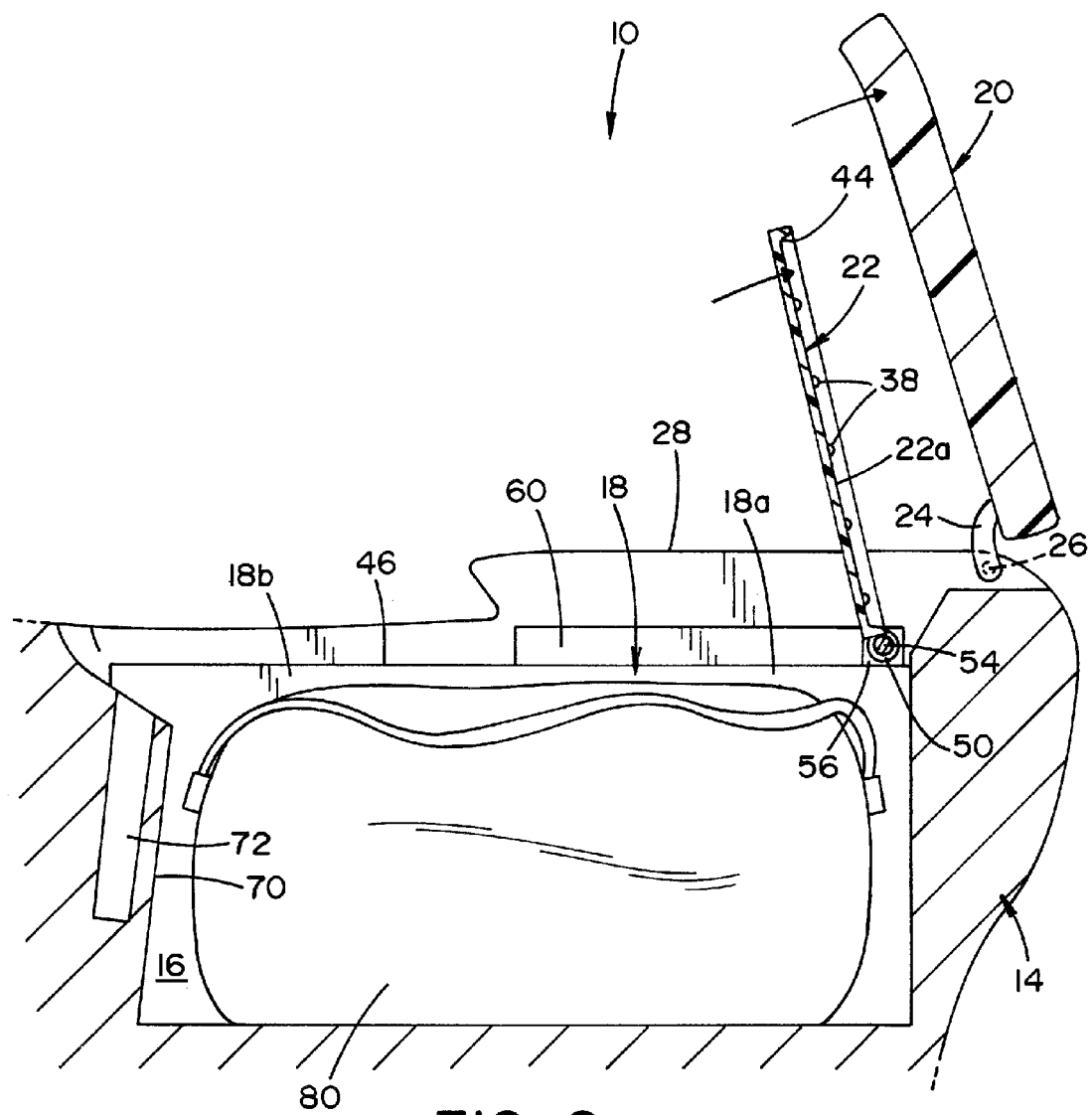
FIG. 6 is a cross-sectional view taken along the line 6-6 of FIG. 5.

The storage compartment assembly 10 of the illustrated embodiment includes a first closure 20 pivotally mounted or secured to the housing 14 for selectively covering a rear portion 18a of the opening 18 via movement between a pivot closed position (FIGS. 1-4) and a pivot open position (FIGS. 5 and 6). The storage compartment assembly 10 can additionally include a second closure 22 movably secured (i.e., slidably and pivotally mounted) to the housing 14 for selectively closing a forward portion 18b of the opening 18 via movement among a slide closed position (FIGS. 1 and 2), a slide open position (FIGS. 3 and 4) and a pivot open position (FIGS. 5 and 6). In particular, the first closure 20 covers the first or rearward portion 18a of the upward facing opening 18 when in the pivot closed position of FIGS. 1-4 and the second closure 22 covers the second or forward portion 18b of the upward facing opening 18 when in the slide closed position of FIGS. 1 and 2.

Figure 3:
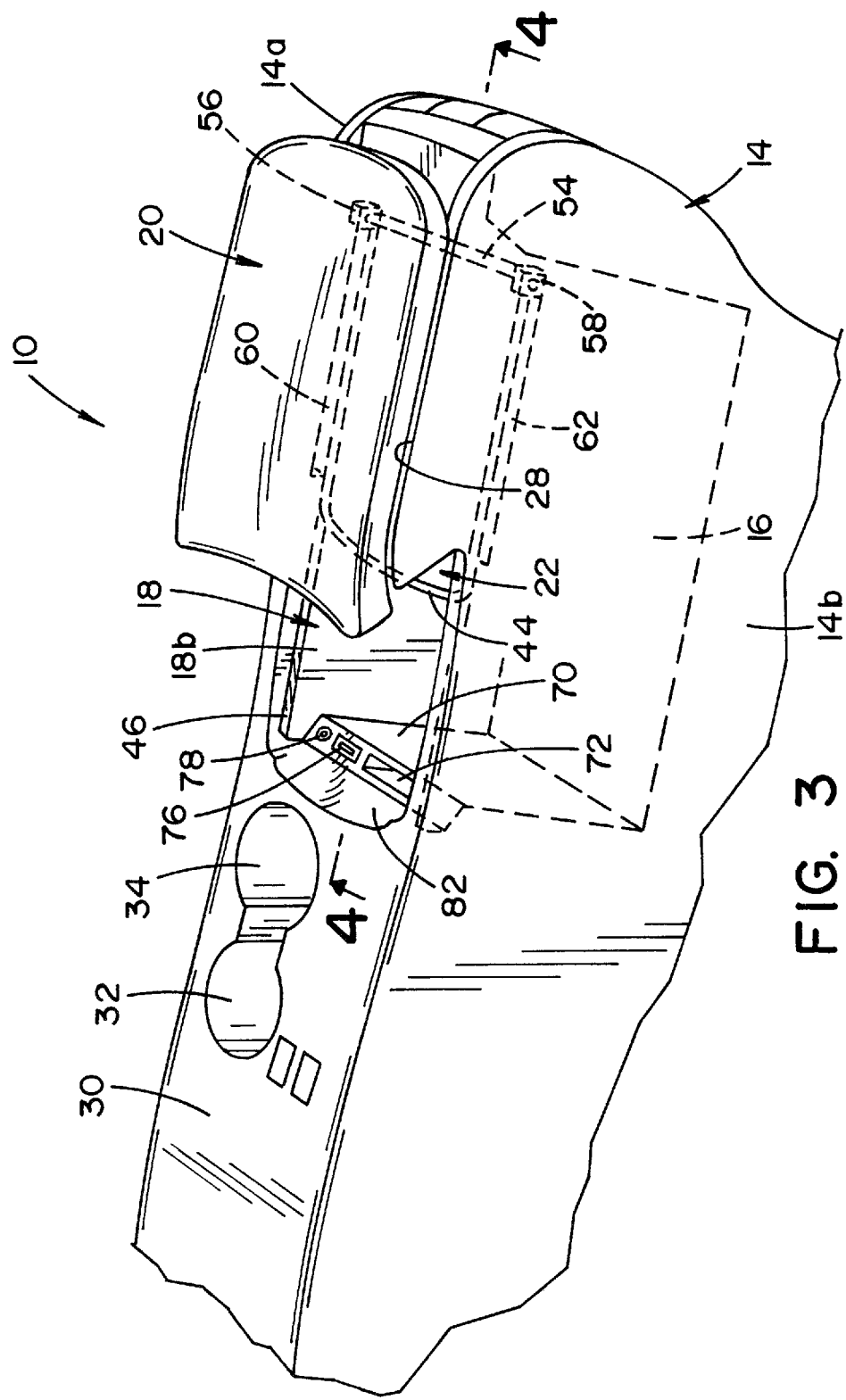
FIG. 3 is another partial perspective view of the center console storage compartment assembly, similar to FIG. 1, but showing the second closure in a slide open position.

The second closure 22 is movable from the slide closed position of FIG. 1 wherein the second closure 22 closes the forward portion 18b of the opening 18 to the slide open position of FIG. 3 wherein access is provided through the forward portion 18b of the opening 18. Thus, as best illustrated in FIGS. 3 and 4, the second closure 22 covers the first portion 18a of the upward facing opening 18 when in the slide open position and provides access into the storage compartment 16 through the second portion 18b when in the slide open position. The second closure 22 is further movable from the slide open position shown in FIG. 3 to the pivot open position shown in FIG. 5, together with the first closure 20 moving to its pivot open position, wherein access is provided through the rear portion 18a of the opening 18 into the storage compartment 16. Thus, the first and second closures 20, 22 provide access into the storage compartment 16 simultaneously through both the first and second portions 18a, 18b of the opening 18 when the first closure 20 is in its pivot open position and the second closure 22 is in its pivot open position.

Figure 9:
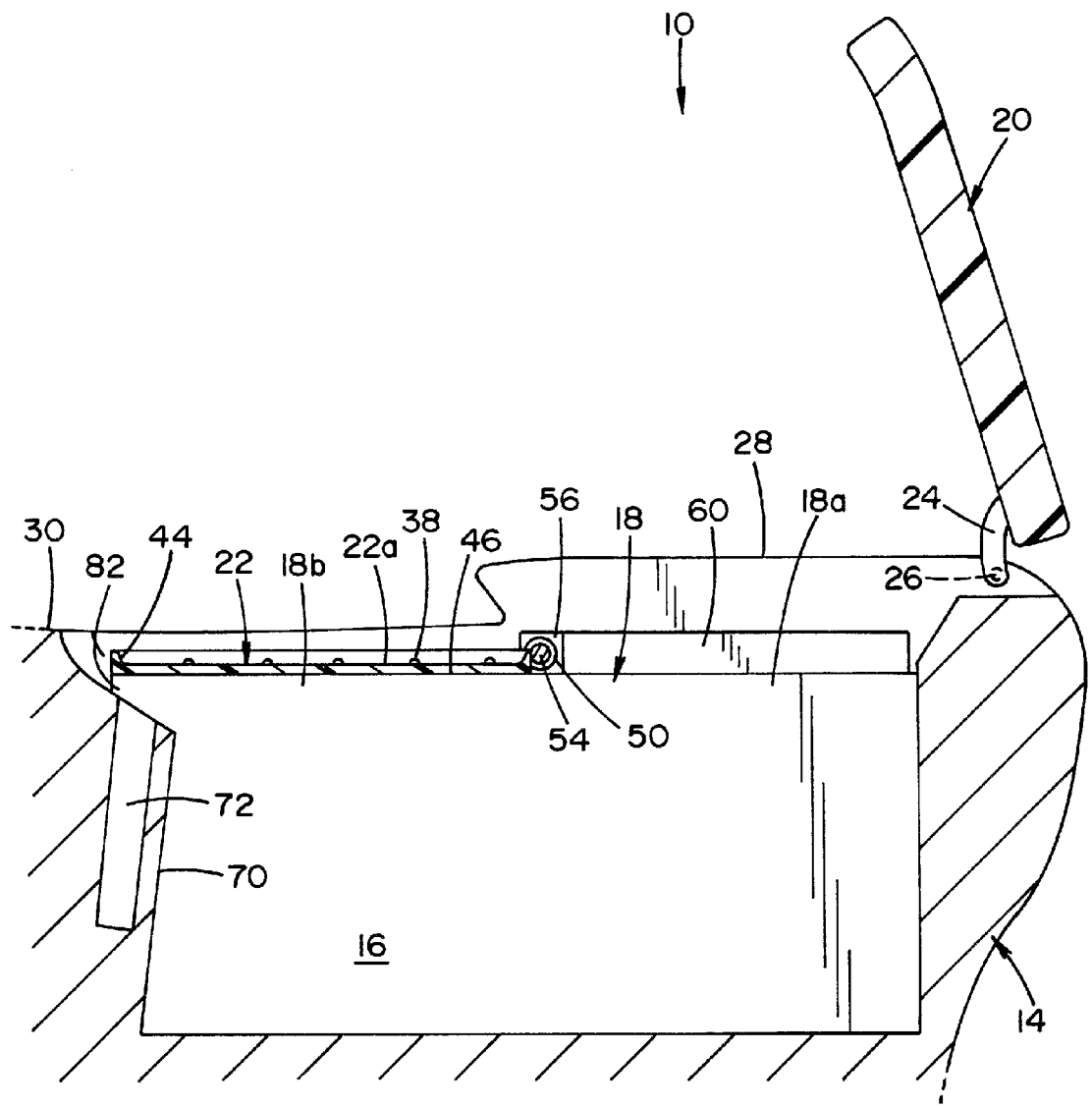
FIG. 9 is a cross-sectional view similar to FIG. 2 but showing the first closure in the pivot open position and the second closure in the slide closed position.
Figure 10:
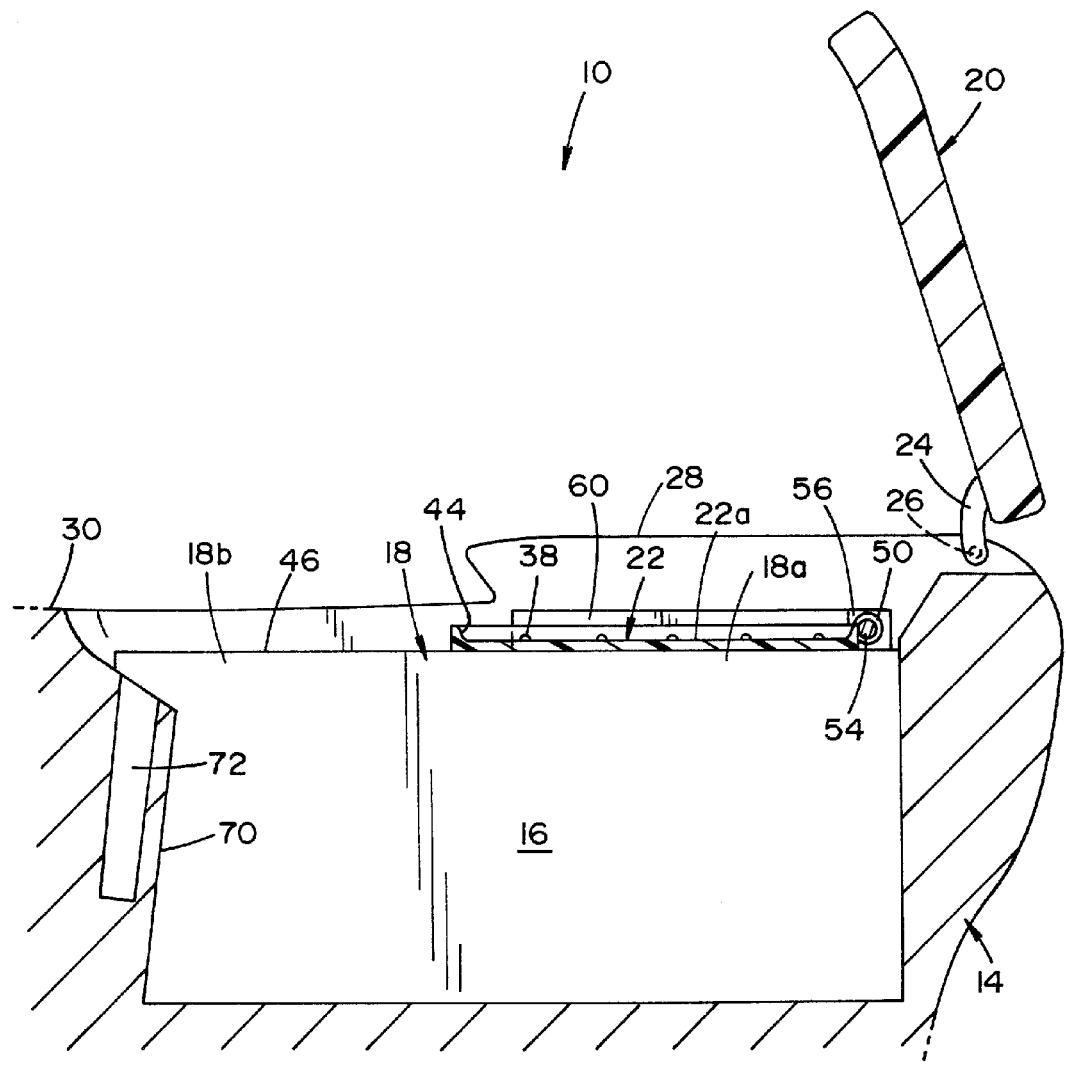
FIG. 10 is another cross-sectional view similar to FIG. 2 but showing the first closure in the pivot open position and the second closure in the slide open position.

In addition, moving the first closure 20 from the pivot closed position to the pivot open position can provide access through only the rear portion 18a of the opening 18 when the second closure is in the slide closed position as shown in FIG. 9 and can provide access to the second closure 22 (e.g., when accommodating accessory items thereon) when the second closure 22 is in the slide open position as shown in FIG. 10. Accordingly, as shown best in FIG. 9, the first and second closures 20, 22 can provide access into the storage compartment 16 through the first portion 18a of the opening 18 when the first closure 20 is in the pivot open position and the second closure 22 is in the slide closed position. Also, as best shown in FIG. 10, the first and second closures 20, 22 can provide access to an upper surface 22a of the second closure 22 when the first closure 20 is in the pivot open position and the second closure 22 is in the slide open position. Moving the second closure 22 into the slide open position with the first closure 20 in the pivot closed position may be desirable when accessory items are stored thereon and it is desired to easily and conveniently hide these accessory items without removing them from the upper side 22a of the second closure 22.

As shown, the first closure 20 can be an armrest having or formed of a cushioning material. In particular, the first closure 20 can include a cushioning material and be positioned within a vehicle as an armrest. In the illustrated embodiment, the first closure 20 is pivotally secured to the housing 14 via pivot links 24 and pivot pins 26. In particular, the pivot links 24 can be curved and can depend from an underside of the first closure 20. Distal ends of the pivot links 24 can have pins 26 extending laterally therefrom (see FIG. 8). These pins 26 can be received within side walls 14a, 14b of the housing 14. These same side walls 14a, 14b can define side boundaries of the storage compartment 16.

Moreover, as shown in the illustrated embodiment, the side walls 14a, 14b can be elevated or include elevated portions relative to a forward portion of the housing 14 so as to elevate the first closure 20, particularly when in the pivot closed position. Top sides 28 of the side walls 14a, 14b can form abutment surfaces against which the first closure 20 rests when in the pivot closed position. Of course, it is to be appreciated by those skilled in the art that other arrangements and/or components can be used to pivotally secure the first closure 20 to the housing 14, and the housing 14 need not have the exact configuration shown in the illustrated embodiment. In addition, if desired, the first closure 20 could be movable secured to the housing 14 to enable sliding action in addition to the illustrated pivoting action, such as might enable convenient and/or comfortable placement of the first closure 20 when in use as an armrest.

Figure 2:
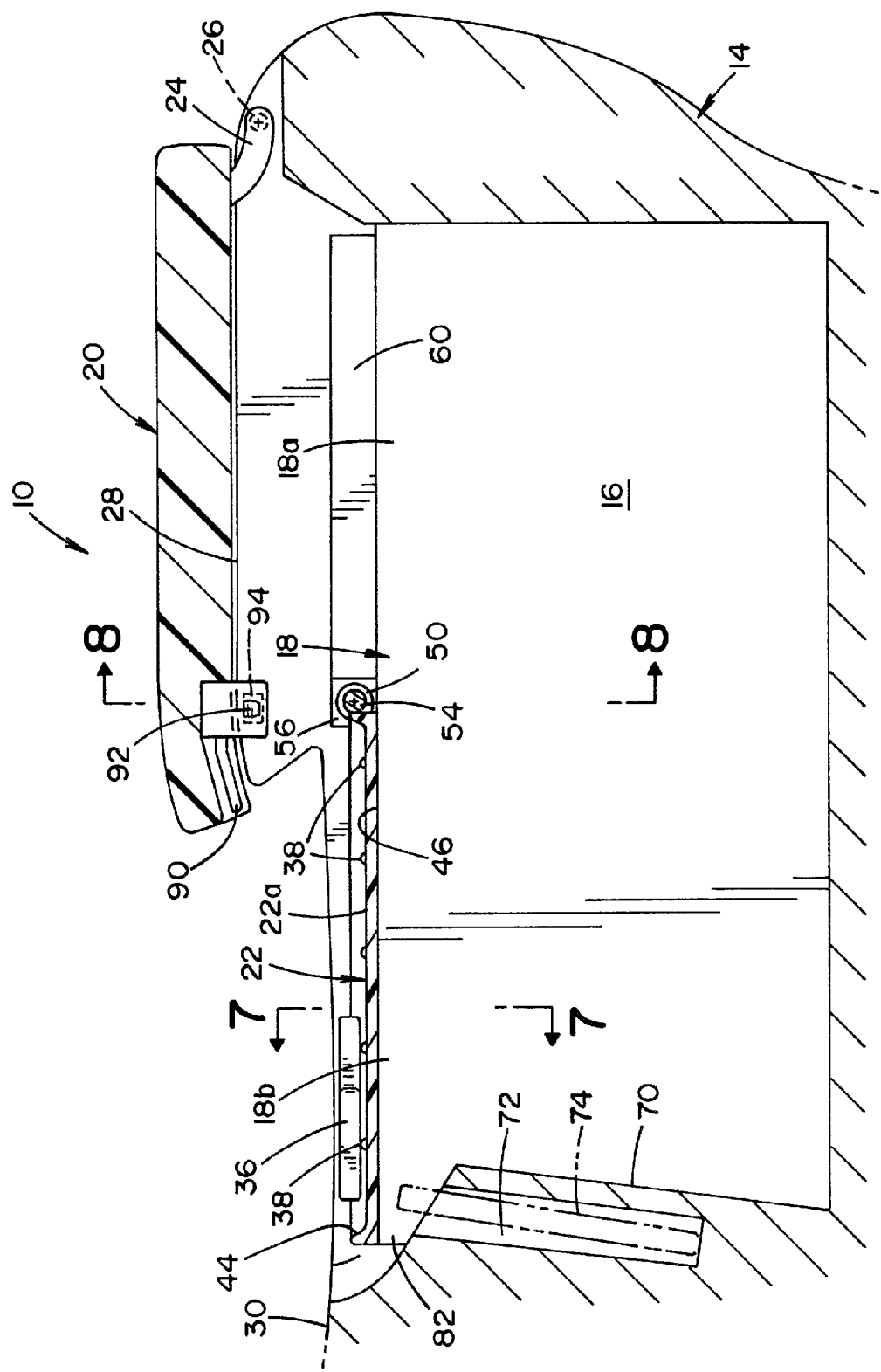
FIG. 2 is a cross-sectional view taken along the line 2-2 of FIG. 1.

The first closure 20 can include any suitable latch for securing the first closure 20 in the closed position. In the illustrated embodiment, and as best shown in FIGS. 2 and 5, the first closure 20 can include a latch assembly comprising a latch actuator 90 and a pair of laterally spaced apart locking members 92 (only one shown) that are urged in laterally outward extending positions (i.e., the position shown in FIG. 5) for engaging a corresponding locking member recess 94. The locking members 92 can be urged toward their respective laterally outward extending positions by springs (not shown) and can be operatively connected to the latch actuator 90 so that the locking members 92 are retracted against the urging of the springs when the latch actuator 90 is pulled upward. When the locking members 92 are received in the corresponding locking member recesses 94, the first closure 20 is locked to the housing 14. Of course, it should be appreciated by those skilled in the art that any other suitable latch assembly could be used for securing the first closure 20 in the closed position with respect to the housing 14.

As mentioned, the housing 14 can be formed within a center console of a vehicle. In such a configuration, the housing 14 can include an upper show surface 30 that is disposed at a lower elevation than the first closure 20 in the illustrated embodiment. If desired, at least one recessed cup holder can be defined in the upper show surface 30 forward relative to the second closure 22. Specifically, in the illustrated embodiment, a pair of cup holders 32, 34 are defined in the upper show surface 30 forward relative to the second closure 22. The illustrated cup holders 32, 34 are shown in a front-to-back alignment wherein the cup holder 32 is disposed forward of the cup holder 34, though this is not required. More generally, it should be appreciated by those skilled in the art that the housing 14 need not be limited to the shape shown in the illustrated embodiment and could instead have almost any suitable shape.

In addition to its combination sliding and pivoting action, the second closure 22 can incorporate one or more additional features to enhance its functionality. For example, the second closure 22 can be configured as a recessed tray for supporting or accommodating one or more items thereon, such as the illustrated electronic device 36 shown supported on the second closure 22 in FIG. 1, which can be a phone, garage door opener, etc. In particular, the upper surface 22a of the second closure 22 can be recessed relative to the surrounding surface, such as the upper show surface 30 of the housing 14. In the illustrated embodiment, the upper surface 22a of the second closure 22 can be recessed relative to the upper show surface 30 of the center console for better accommodating stored accessory items. Aesthetically and functionally, this also provides an intuitive location for receiving and storing various articles and/or accessory items in the vehicle.

As another feature, the second closure 22 can include a plurality of gripping rails or strips 38, though this is not required. As shown, each of the plurality of gripping rails 38 can extend laterally across an upper surface of the second closure 22. Further, each of the plurality of gripping rails 38 can be formed of a resilient gripping material, such as rubber for example. The gripping rails 38 can be spaced apart from one another along a longitudinal length of the vehicle, which may also be a longitudinal length of the center console. As shown, the gripping rails 38 can be very thin in width, though this is not required.

Still as a further feature, the second closure 22 includes a raised lip 44 disposed adjacent a leading edge of the second closure 22. In the illustrated embodiment, the lip 44 extends around an entire periphery of the second closure 22, though this is not required. More particularly, in the illustrated embodiment, the second closure 22 includes raised leading lip 44 for facilitating gripping of the second enclosure 22 during movement between the slide closed position of FIG. 1 and the slide open position of FIG. 3, and further for preventing one or more items supported thereon (e.g., portable electronic device 36) from sliding off the second closure 22 and falling into the storage compartment 16 when the second closure 22 is in the slide open position of FIG. 3 or any of a plurality of partially open positions between the slide open position of FIG. 3 and the slide closed position of FIG. 1. In conjunction with the raised lip 44 at the forward or leading edge of the second closure 22, a gap 82 can be provided between the leading edge and the adjacent portion of the housing 14. This gap can facilitate gripping of the raised lip 44 (i.e., gripping of the second closure) and/or can provide a convenient throughway for cords or wires. For example, a portable phone can be carried on the upper surface 22a of the second closure 22 and remain electrically connected to the a port (e.g. ports 76 and 78) disposed in the storage compartment 16.

Figure 8:
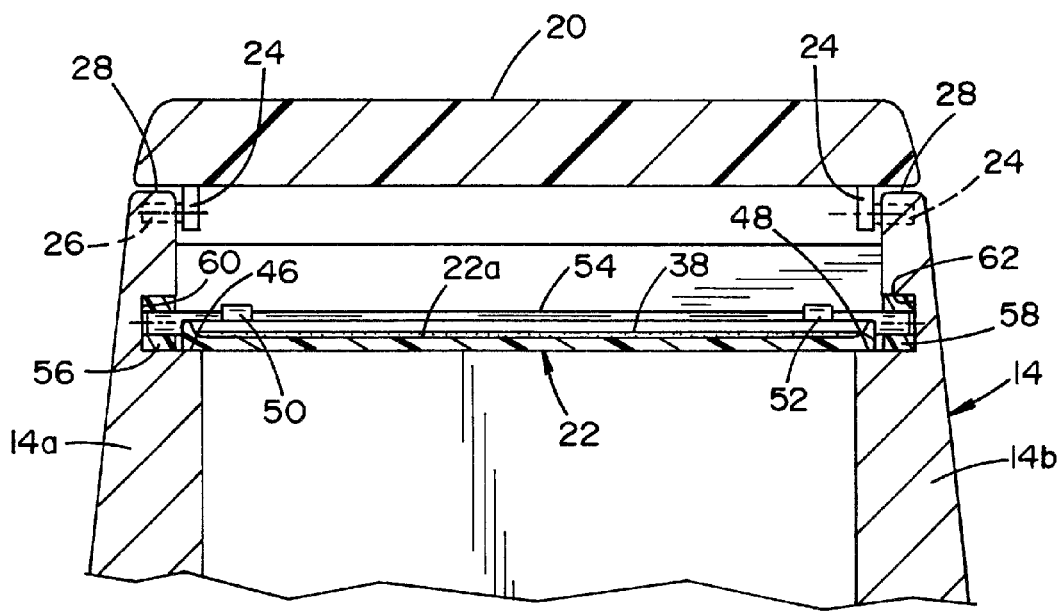
FIG. 8 is a cross-sectional view taken along the line 8-8 of FIG. 2 showing the first and second closures being movably secured to the housing.

With reference to FIG. 8, sliding movement of the second closure 22 can be facilitated by the closure 22 resting on shoulder portions 46, 48 of the housing 14. In addition, the second closure 22 includes rear mounting portions 50, 52 through which a pivot rod 54 passes and extends laterally outward on either side of the second closure 22. Ends of the pivot rod 54 are received in sliding blocks 56, 58 which are themselves accommodated in recesses 60, 62 defined in the side walls 14a, 14b of the housing 14. The sliding blocks 56, 58 slidably move within the recesses 60, 62 to enable the second closure 22 to move between the slide closed position of FIG. 1 and the slide open position of FIG. 3.

The pivot rod 54 allows for pivotal movement between the second closure 22 and the sliding blocks 56, 58. Thus, the second closure 22, when in the slide open position of FIG. 3, can be pivoted open relative to the sliding blocks 56, 58 and also relative to the housing 14 for movement between the slide open position and the pivot open position. The second closure 22 can include friction hinges (i.e., the engagement between the ends of the pivot rod 54 and the sliding blocks 56, 58 can be interference fits creating friction hinges) allowing the second closure 22 to move to the pivot open position and be held in the pivot open position without the application of any manual force. Alternately, the pivot rod 54 and the second closure 22 could be integrally formed together and both could pivot relative to the sliding blocks 56, 58. As a further alternate, it should be appreciated by those skilled in the art that the sliding and/or pivoting movement of the second closure 22 relative to the housing 14 could be provided via other arrangements and/or components than those shown or described herein.

With reference to FIGS. 11 and 12, the vehicle storage compartment assembly 10 can additionally include a latching assembly 100 for securing the second closure 22 in the closed position. In particular, the latching assembly 100 can be provided for securing the second closure 22 in the closed position during a rear crash event. The latching assembly 100 of the illustrated embodiment includes a lever member 102 having a first leg 102a and a second leg 102b. The lever member 102 is pivotally movable about pivot 104 and is urged to rotate in a first direction (e.g., clockwise in the figures), such as by a spring 106 connected between the housing 14 and the leg 102a. The leg 102b includes a latch portion 108 at its distal end. The latch portion 108 is normally held back by the spring 106 as shown in FIG. 11; however, when the vehicle in which the assembly 10 is provided experiences certain collision events (e.g., a rear crash event), the latch member 102 rotates in a second, opposite direction (e.g., counterclockwise in the figures) against the urging of the spring 106 so that the latch portion 108 can move into the path of the second closure 22 prior to the second closure 22 sliding open due to the crash event and thereby the latch portion 108 inhibits movement of the second closure 22 toward the slide open position. Alternatively, and as should be appreciated by those skilled in the art, any other suitable latch or latching assembly could be employed for securing the second closure 20 in the closed position, such as during a crash event.

Separately, it should be further appreciated that some type of linkage could be provided between the first and second closures 20, 22 that would cause pivotally movement by one of the closures 20 or 22 to be transferred to the other of the closures 20 or 22. In this manner, pulling open one of the closures 20 or 22 to the pivot open position could cause opening of the other of the closures 20 or 22 to the pivot open position without requiring separate opening action to by be manually applied by a user.

Figure 7:
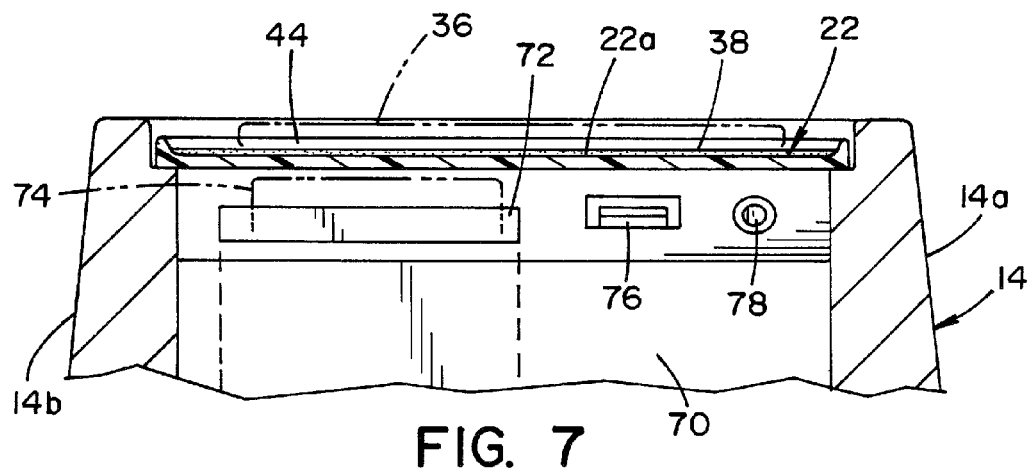
FIG. 7 is a cross-sectional view taken along the line 7-7 of FIG. 2 showing a forward wall of the storage compartment assembly.

With reference to FIG. 7, the housing 14 includes a forward wall 70 that defines a forward boundary of the storage compartment 16. The forward wall 70, as shown, can optionally include a receptacle 72 defined therein appropriately sized for holding a portable electronic device (e.g., portable electronic device 74, which can be a portable phone). In addition, the forward wall 70 can include a USB port 76 and/or a power port 78. Alternatively, forward wall 70 can be provided without one or more of these features and/or one or more of these features can be disposed on another of the walls defining the storage compartment 16.

In operation, when the first closure is in the pivot closed position and the second closure is in the slide closed position, the storage compartment 16 is closed (FIGS. 1 and 2). In this configuration, the second closure 22 can function as a storage tray and thus can receive accessory items thereon. The second closure 22 can be moved from a slide closed position of FIG. 1 to the slide open position of FIG. 3 to provide access into the storage compartment 16 through the forward portion 18b of the opening 18. This also conveniently provides access to any features incorporated into the forward wall 70 of the housing 14. Aesthetically, the first closure 20 remains closed and provides a pleasing appearance.

When desired to have full access into the storage compartment 16, the first closure 20 can be moved to the pivot open position and the second closure 22 can be moved to its pivot open position. In this configuration, the vehicle operator or passenger has full access to the storage compartment 16. Accordingly, the second closure 22 has both slide action and rotation/pivot action. The first closure 20 and the second closure 22 together act as doors for the relatively large storage compartment 16. In fact, the storage compartment 16 can be sized to accommodate a very large purse (e.g., illustrated purse 80). Advantageously, when both closures 20, 22 are moved to their respective pivot open positions, complete access to the large storage area of the storage compartment 16 is gained. That is, the entire opening 18, including rearward portion 18a and forward portion 18b, is open and accessible.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle storage compartment assembly, comprising:
   a housing defining a storage compartment with an upward facing opening;
   a first closure pivotally mounted to the housing for movement between a pivot closed position and a pivot open position; and
   a second closure slidably and pivotally mounted to the housing for movement among a slide closed position, a slide open position and a pivot open position,
   wherein the first closure covers a first portion of the upward facing opening when in the pivot closed position and the second closure covers a second portion of the upward facing opening when in the slide closed position, and wherein the second closure covers the first portion of the upward facing opening when in the slide open position and provides access into the storage compartment through the second portion when in the slide open position.

2. The vehicle storage compartment assembly of claim 1 wherein the first and second closures provide access into the storage compartment through the second portion of the upward facing opening when the second closure is in the first slide closed position and the first closure is in the pivot open position.

3. The vehicle storage compartment assembly of claim 2 wherein the first and second closures provide access into the storage compartment simultaneously through both the first and second portions of the upward facing opening when the first closure is in the pivot open position and the second closure is in the pivot open position.

4. The vehicle storage compartment assembly of claim 1 wherein the second closure is configured as a tray for supporting one or more items thereon.

5. The vehicle storage compartment assembly of claim 4 wherein the second closure includes a plurality of gripping rails.

6. The vehicle storage compartment assembly of claim 5 wherein each of the plurality of gripping rails extend laterally across an upper surface of the second closure and is formed of a resilient gripping material.

7. The vehicle storage compartment assembly of claim 4 wherein the second closure includes a raised leading lip for facilitating gripping of the second closure during movement between the slide closed position and the slide open position and for preventing the one or more items supported thereon from sliding off the second closure and falling into the storage compartment when the second closure is in the slide open position or any of a plurality of positions between the slide open position and the slide closed position.

8. The vehicle storage compartment assembly of claim 1 wherein the housing includes a forward wall defining a forward boundary of the storage compartment, the forward wall including a receptacle defined therein appropriately sized for holding a portable electronic device.

9. The vehicle storage compartment assembly of claim 8 wherein the forward wall includes a USB port and a power port.

10. The vehicle storage compartment assembly of claim 1 wherein the first closure is an arm rest having a cushioning material.

11. The vehicle storage compartment assembly of claim 1 wherein the second closure includes a friction hinge allowing the second closure to move to the pivot open position and be held in the pivot open position.

12. The vehicle storage compartment assembly of claim 1 wherein the housing is formed within a center console of a vehicle and includes an upper show surface, an upper surface of the second closure is recessed relative to the upper show surface of the center console to accommodate stored accessory items.

13. The vehicle storage compartment assembly of claim 12 wherein at least one recessed cup holder is defined in the upper show surface forward relative to the second closure.

14. A center console storage compartment assembly for a vehicle, comprising:
   a housing defining a storage compartment therein with an opening to access the storage compartment;
   a first closure pivotally secured to the housing for selectively covering a rear portion of the opening;
   a second closure movably secured to the housing for selectively closing a forward portion of the opening, the second closure movable from a slide closed position wherein the second closure closes the forward portion of the opening to a slide open position wherein the second closure is slid rearwardly under the first closure and access is provided through the forward portion, the second closure further movable from the slide open position to a pivot open position together with the first closure moving to a pivot open position wherein access is provided through the rear portion of the opening.

15. The center console storage compartment of claim 14 wherein the first closure includes a cushioning material and is positioned within a vehicle as an armrest.

16. The center console storage compartment assembly of claim 14 wherein the second closure is recessed relative to a surrounding surface of the housing that defines the opening.

17. The center console storage compartment assembly of claim 16 wherein the second closure includes a raised lip disposed adjacent a leading edge of the second closure and a plurality of gripping strips.

18. A dual closure storage assembly for a vehicle, comprising:
   a first closure pivotally secured to a housing for selectively closing a rear portion of an upward facing opening of a storage compartment; and
   a second closure slidably and pivotally secured to the housing for selectively closing a forward portion of the upward facing opening of the storage compartment, the second closure slidable between a first position closing a forward portion of the upward facing opening and a second position closing the rear portion of the upward facing opening.

19. The dual closure storage assembly of claim 18 wherein the second closure is configured as a recessed tray to accommodate articles thereon.

20. The center console storage compartment assembly of claim 14 wherein a respective pivot axis of each of the first and second closures is disposed at the rear of the storage compartment.

21. The dual closure storage assembly of claim 18 wherein the second closure is horizontally oriented in both the first and second positions.

\* \* \* \* \*